United States Patent [19]

Klaus

[11] Patent Number: 4,964,421
[45] Date of Patent: Oct. 23, 1990

[54] WATER SAVER VALVE

[76] Inventor: Joseph C. Klaus, 2545-Pheasant Run, Wexford, Pa. 15090

[21] Appl. No.: 388,008

[22] Filed: Aug. 2, 1989

[51] Int. Cl.⁵ .............................................. F16K 17/32
[52] U.S. Cl. .................................... 137/460; 137/486
[58] Field of Search ............... 137/486, 498, 502, 460, 137/492.5

[56] References Cited

U.S. PATENT DOCUMENTS

| 1,407,993 | 2/1922 | Earl | 137/486 X |
| 1,514,839 | 11/1924 | Edwards et al. | 137/498 X |
| 1,550,717 | 8/1925 | Towle | 137/486 X |
| 2,566,773 | 9/1951 | Otis | 137/486 |
| 2,566,775 | 9/1951 | Otis | 137/486 |
| 3,395,726 | 8/1968 | Cross et al. | 137/468 |
| 3,994,029 | 11/1976 | Badders | 137/445 X |
| 4,364,409 | 12/1982 | Jones | 137/486 |
| 4,506,594 | 3/1985 | Rowland et al. | 137/486 X |

Primary Examiner—Stephen M. Hepperle
Attorney, Agent, or Firm—H. Jay Spiegel & Assoc.

[57] ABSTRACT

The present invention relates to a valve designed to be coupled to the inlet of a toilet tank so that water which is flowing into the tank must flow through the valve. The valve includes a gate actuated by a pilot valve sensing pressures across a flow restriction. When the flow rate increases beyond a certain degree responsive to failure of the float valve in the toilet supply tank, the pilot valve is actuated allowing fluid pressure in the line to close the gate valve.

12 Claims, 1 Drawing Sheet

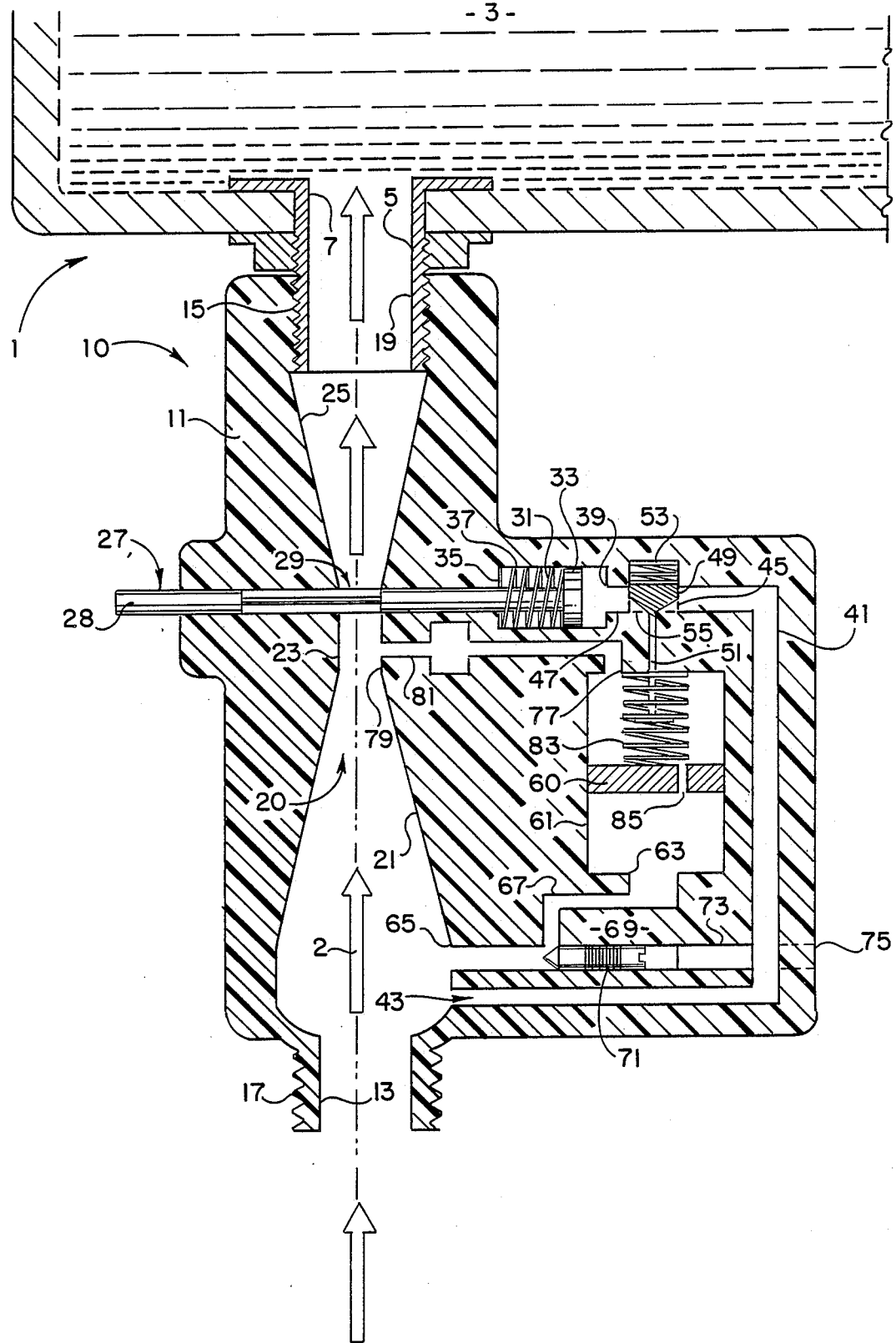

WATER SAVER VALVE

BACKGROUND OF THE INVENTION

The present invention relates to a water saver valve. In the prior art, pilot actuated valves are known. Cross et al. U.S. Pat. No. 3,395,726 and Rowland U.S. Pat. No. 4,506,594 each teach the concept of a valve which is operated by a pilot valve. Furthermore, Badders U.S. Pat. No. 3,994,029 discloses a fluid control system for a toilet which includes hydraulic actuation of the tank ball 152 thereof. However, Badders fails to teach any flow responsive pilot actuated valving for the inlet thereof.

Furthermore, the Cross et al. and Rowland et al. patents, while each teaching a pilot activated valve, differ in several respects from the teachings of the present invention. Concerning Cross et al., among other reasons, the structure and operation of the pilot valve and main valve differ from the teachings of present invention. Concerning Rowland et al., again, the structure of the pilot valve and main valve differ from the teachings of the present invention as do their manner of operation.

SUMMARY OF THE INVENTION

The present invention relates to a water saver valve. The invention includes the following interrelated aspects and features:

(a) In a first aspect, the inventive valve is contained within a housing having a flow passageway extending therethrough and terminating at each end in a flow coupling. One flow coupling is adapted to be coupled to a fitting on a toilet tank, whereas the other coupling is designed to be coupled to the conduit designed to supply water to the tank.

(b) The flow passageway has an inlet connected to a converging section connecting with a throat connecting with a diverging section which connects with an outlet. In the preferred embodiment, the inlet fitting is externally threaded while the outlet fitting is interiorly threaded.

(c) A sliding gate valve extends across the throat and is spring biased in a direction aligning an orifice thereof with a throat to allow flow therethrough. The gate valve has a piston on on end thereof slidably contained within a cylinder in the housing with biasing means bearing against the piston to bias the gate valve in the above described open position.

(d) The housing includes a pilot valve which includes a sliding pilot piston resiliently biased in one direction within a cylinder. One end of the cylinder communicates with fluid pressure upstream of the throat, whereas the other end of the cylinder communicates with fluid pressure within the throat.

(e) A pilot valve is contained within a passageway supplying fluid pressure from the inlet with the side of the gate piston. When the pilot valve is opened by virtue of movements of the pilot piston described above, fluid pressure from the inlet will bear against the gate piston causing the gate to be moved to a position closing the throat. The resilient bias on the gate piston will be overcome by fluid pressure bearing on the other side of the gate piston. However, when the problem which precipitated gate closure is solved, the resilient bias will allow manual actuation to move the piston and the gate valve to a position re-aligning the orifice thereof with the throat.

As such, it is a first object of the present invention to provide a water saver valve.

It is a further object of the present invention to provide such a valve designed to be interposed into the fluid supply to a toilet tank.

It is a still further object of the present invention to provide such a valve which may stop fluid flow responsive to sensing of failure of a float valve in the associated toilet supply tank.

It is a yet further object of the present invention to provide such a valve which may have general utility in fluid flow systems.

These and other objects, aspects and features of the present invention will be better understood from the following detailed description of the preferred embodiment when read in conjunction with the appended drawing figure.

BRIEF DESCRIPTION OF THE DRAWING

The sole figure shows a cross-sectional view through the inventive water saver valve.

SPECIFIC DESCRIPTION OF THE PREFERRED EMBODIMENT

With reference to the sole figure, a toilet tank is generally designated by the reference numeral 1 and is seen to include a internal chamber 3 as well as an inlet 7 accessed by a fitting 5.

The inventive water saver valve is generally designated by the reference numeral 10 and is seen to include a housing 11 having an inlet 13 and outlet 15. As seen in the figure, the inlet 13 is externally threaded at 17 while the outlet is internally threaded at 19.

Between the inlet 13 and outlet 15, a passageway 20 is provided which includes a converging section 21, a throat 23 and a diverging section 25. The converging section 21 is fluidly connected to the inlet 13 while the diverging section 25 is connected to the outlet 15.

A gate valve 27 includes an orifice 29 as well as a stem 31 having an end which comprises a piston 33 slidably mounted within a cylinder 35 and biased in the right-hand direction in the figure by virtue of the spring 37. The cylinder 35 has an access port 39 which connects with a passageway 41 having a port 43 fluidly connected adjacent the inlet 13 and at the entrance to the converging section 21.

The passageway 41 includes a valve seat 45 on which rests the pilot valve 47 which includes valve head 49 and valve stem 51. A spring 53 in the subchamber 55 bears against the valve head 49 to bias it in the direction of engagement with the valve seat 45 thus closing communication between the passageway 41 and the cylinder 35.

The pilot valve 47 is actuated through engagement on the stem 51 by a pilot piston 60 slidably contained within a cylinder 61. The cylinder 61 includes a first port 63 connected to a port 65 adjacent the converging section 21 by a passageway 67 which has contained therein variable restrictor 69. The variable restrictor 69 comprises a needle having a threaded exterior 71 threadably mounted within a threaded passageway 73. The passageway 73 opens at 75 on the exterior of the housing 11 so that a tool (not shown) may be inserted therein to allow fine adjustment of the position of the needle 69 within the passage way 67.

The cylinder 60 has a second port 77 at an end opposite to the end where the port 63 is located, which port 77 is connected to a port 79 in the throat 23 by a passageway 81. A spring 83 biases the piston 60 in the downward direction in the view of the sole figure. Furthermore, a bleed hole 85 is provided in the piston to smooth out its movements within the cylinder.

As should be understood by those skilled in art, when fluid is flowing within the passageway 20 in the direction of the arrow 2, the pressure seen at the port 65 will always be greater than the pressure seen at the port 79. As the rate of flow within the passageway 20 in the direction of the arrow 2 increases, the differential between the pressures at the ports 65 and 79 will necessarily increase. This differential pressure between the pressure at the port 65 and the pressure at the port 79, when great enough, will overcome the resilient downward bias of the spring 83 to cause movement of the piston 60 in the upward direction.

As should be further understood by those skilled in the art, the differential pressure as seen within the cylinder 61 generally corresponds to the differential pressures seen at the ports 65 and 79. The word generally is used because through adjustment of the needle valve 69, this relationship may be selectively altered. Thus, with a needle valve 69 completely open so that flow through the passage way 67 is unrestricted, the relationship of pressures within the cylinder 61 on opposed sides of the valve 60 will correspond to the relationship between the pressures at the ports 65 and 79. When it is desired to modify this relationship, the needle valve 69 may be advanced within the passageway 67 to reduce the pressure on the bottom side of the piston 60 with respect to the pressure which would exist where the needle valve 69 completely retracted. Thus, in this way, movements of the piston 60 may be adjusted so that the piston 60 moves in response to different particular rates of flow of fluid in the passageway 20.

In the operation of the inventive valve device 10, with fluid flowing in the direction of the arrow 2, fluid flows through the inlet 13 and thence to the converging section 21, throat 23, diverging section 25, outlet 15, inlet fitting 5 of the toilet tank 1, port 7 thereof and thence into the chamber 3 to fill the tank.

As is well known, the tank 1 has an outlet valve normally known as a ball (not shown) which may be selectively activated by a handle (not shown) to control flow of water from the tank and into the toilet bowl to flush the toilet. Should this ball become defective, flow of water in the direction of the arrow 2 may significantly increase once the tank 1 is empty. Such increase will result in the differential pressure between the pressure at the port 65 and the pressure of the port 79 increasing as well. As this differential pressure increases as sensed across the piston 60, to a degree exceeding the downward bias of the spring 83, the piston 60 will begin to move upwardly in the view of the figure.

When the piston 60 has moved upwardly a degree allowing engagement with the stem 51 of the pilot valve 47, further upward movement will cause movement of the stem 51 and valve head 49 of the pilot valve 47 thus removing the head 49 from the valve seat 45 to communicate fluid pressure at the port 43 with the cylinder 35. The force exerted by the spring 37 against tee piston 33 is set to be less than the force which will be exerted on the piston 33 from water flowing from the port 43 when the differential pressure between the ports 65 and 79 is sufficient to cause opening of the pilot valve 47. Thus, whenever the pilot valve 47 is opened, the fluid pressure in the passage way 41 will be sufficient to cause instant movement of the piston 33 in the left-hand direction thus moving the gate valve 27 in a likewise manner. Such movement of the gate valve 27 will cause the orifice 29 thereof to become misaligned with the throat 23 thus closing the throat 23 and isolating the outlet 15 from the inlet 13.

Once tee gate valve 27 has been closed, flow ceases in the passageway 20. As such, the bottom face of the piston 60 feels the pressure from fluid flowing through the passageway 67 while the pressure on the top face of the piston 60 will increase due to the now static nature of the fluid. Thus, as the pressures equalize across the piston 60, the force of the spring 83 will begin to overcome the now reduced differential pressure above and below the piston 60 so that the spring 83 may thence move the piston 60 to the position shown in the sole figure, with the spring 53 thereby closing the pilot valve 47.

In such configuration, since there is no bleed passageway between the piston 33 and the valve 49, the gate valve 27 will be maintained in a closed position. When it is desired to open the gate valve, the button 28 which is now exposed may be depressed toward the housing 11 to expel fluid from the passageway 41 downstream of the valve head 49 and upstream of the piston 33, with the valve 47 acting as a check valve allowing such reverse flow. Thereafter, with the orifice 29 now aligned with the throat 23, the force of the spring 37 will maintain the orifice 29 in alignment with the throat 23.

Of course, alternatively, a bleed passageway may be provided between the valve head 49 and the piston 33 so that after the pressures have equalized across the piston 60, fluid will be allow to bleed out from the area adjacent the port 39 to allow the spring 37 to move the piston 33 and thus the gate valve 27 to the open position shown in the sole figure.

As stated above, the bleed hole 85 in the piston 60 is provided to allow dampening of the movements of the piston in response to surges of fluid flow. Thus, an instantaneous surge of flow which quickly ends will not result in closing of the gate valve 27.

While the present invention has been described in terms of its association in a system whereby fluid is being filled in a toilet tank, of course, the inventive valve 10 may have utility in other relations. In particular, in any fluid system where it is desired to shut off supply of fluid flow responsive to sensing of rate of fluid flow above a desired degree, the inventive valve may be employed.

As such, an invention has been disclosed in terms of a preferred embodiment thereof which fulfills each and every one of the objects of the invention as set forth hereinabove and provides a new and improved water saver valve of great novelty and utility.

Of course, various changes, modifications and alterations in the teachings of the present invention may be contemplated by those skilled in the art without departing from the intended spirit and scope thereof. As such, it is intended that the present invention only be limited by the terms of the appended claims.

I claim:

1. A valve device comprising:
   (a) a housing having an inlet, an outlet and a passageway therebetween, said passageway including, in a direction from said inlet to said outlet a converging section, a throat and a diverging section;

(b) valve means for controlling fluid flow in said passageway, said valve means having a first open position and a second closed position, (c) actuator means for said valve means for controlling actuation thereof, said actuator means comprising:

(i) a fluid motor connected to said valve means and a motor passageway fluidly communicating said fluid motor with said passageway upstream of said throat; elongated in a direction of said further fluid motor (ii) a pilot valve including a stem and a valve head connected to said stem and controlling flow through said motor passageway;

(iii) a pilot actuator for actuating said pilot valve including a motor chamber in which a further fluid motor may move, a first conduit fluidly communicating one side of said further fluid motor with fluid pressure upstream of said throat and a second conduit fluidly communicating another side of said further fluid motor with said throat;

(iv) a variable restrictor in said first conduit, and;

(v) said further fluid motor being unconnected to said pilot valve but engaging said pilot valve stem when differential pressure across said sides of said further fluid motor exceeds a desired amount to open said pilot valve and allow fluid pressure in said motor passageway to close said valve means.

2. The invention of claim 1, wherein said variable restriction comprises an adjustable needle valve.

3. The invention of claim 1, wherein said valve means comprises a reciprocable gate valve.

4. The invention of claim 3, wherein said fluid motor comprises a piston.

5. The invention of claim 1, wherein said motor chamber comprises a cylinder and said further fluid motor comprises a piston.

6. The invention of claim 1, wherein said pilot valve is biased in a closed position thereof.

7. The invention of claim 5, wherein said further fluid motor is biased in a direction away from said pilot valve.

8. The invention of claim 1, wherein in said second closed position of said valve means, a portion thereof protrudes from said housing, said portion being manually engageable to reset said valve means to said first open position thereof.

9. The invention of claim 1, wherein said inlet and outlet each has a portion of fluid coupling incorporated therewith.

10. A valve device comprising:
(a) a housing having an inlet, an outlet and a passageway therebetween, said passageway including, in a direction from said inlet to said outlet a converging section, a throat and a diverging section;
(b) valve means for controlling fluid flow in said passageway, said valve means having a first open position and a second closed position;
(c) actuator means for said valve means for controlling actuation thereof, said actuator means comprising:
(i) a fluid motor connected to said valve means and a motor passageway fluidly communicating said fluid motor with said passageway upstream of said throat;

(ii) a pilot valve including a valve head controlling flow through said motor passageway;

(iii) a pilot actuator for actuating said pilot valve including a motor chamber in which a further fluid motor may move, a first conduit fluidly communicating one side of said further fluid motor with fluid pressure upstream of said throat and a second conduit fluidly communicating another side of said further fluid motor with said throat;

(iv) a variable restrictor comprising an adjustable needle valve in said first conduit; and (v) said further fluid motor being unconnected to said pilot valve but engaging said pilot valve when differential pressure across said sides of said further fluid motor exceeds a desired amount to open said pilot valve and allow fluid pressure in said motor passageway to close said valve means.

11. A valve device comprising:
(a) a housing having an inlet, an outlet and a passageway therebetween, said passageway including, in a direction from said inlet to said outlet a converging section, a throat and a diverging section;
(b) valve means for controlling fluid flow in said passageway, said valve means having a first open position and a second closed position;
(c) actuator means for said valve means for controlling actuation thereof, said actuator means comprising:
(i) a fluid motor connected to said valve means and a motor passageway fluidly communicating said fluid motor with said passageway upstream of said throat;
(ii) a pilot valve including a valve head controlling flow through said motor passageways;
(iii) a pilot actuator for actuating said pilot valve including a motor chamber comprising a cylinder in which a further fluid motor comprising a piston may move, a first conduit fluidly communicating one side of said further fluid motor with fluid pressure upstream of said throat and a second conduit fluidly communicating another side of said further fluid motor with said throat, said further fluid motor being biased in a direction away from said pilot valve;
(iv) a variable restrictor in said first conduit; and,
(v) said further fluid motor being unconnected to said pilot valve but engaging said pilot valve when differential pressure across said sides of said further fluid motor exceeds a desired amount to open said pilot valve and allow fluid pressure in said motor passageway to close said valve means.

12. A valve device comprising:
(a) a housing having an inlet, an outlet and a passageway therebetween, said passageway including, in a direction from said inlet to said outlet a converging section, a throat and a diverging section;
(b) valve means for controlling fluid flow in said passageway, said valve means having a first open position and a direction from said inlet to said outlet a converging section, a throat and a diverging section;
(b) valve means for controlling fluid flow in said passageway, said valve means having a first open position and a position of said valve means, a portion thereof protrudes from said housing, said portion being manually engageable to reset said valve means to said first open position thereof;

(c) actuator means for said valve means for controlling actuation thereof, said actuator means comprising:
  (i) a fluid motor connected to said valve means and a motor passageway fluidly communicating said fluid motor with said passageway upstream of said throat;
  (ii) a pilot valve including a valve head controlling flow through said motor passageway;
  (iii) a pilot actuator for actuating said pilot valve including a motor chamber in which a further fluid motor may move, a first conduit fluidly communicating one side of said further fluid motor with fluid pressure upstream of said throat and a second conduit fluidly communicating another side of said further fluid motor with said throat;
  (iv) a variable restrictor in said first conduit; and,
  (v) said further fluid motor being unconnected to said pilot valve but engaging said pilot valve when differential pressure across said sides of said further fluid motor exceeds a desired amount to open said pilot valve and allow fluid pressure in said motor passageway to close said valve means.

* * * * *